United States Patent
Pereira et al.

(10) Patent No.: US 10,959,376 B2
(45) Date of Patent: Mar. 30, 2021

(54) ELEVATOR ASSEMBLY FOR AN AGRICULTURAL HARVESTER WITH A STORAGE HOPPER HAVING A CONVEYOR THEREIN

(71) Applicant: CNH Industrial America LLC, New Holland, PA (US)

(72) Inventors: Alessandro Roberto Pereira, Piracicaba (BR); Marcelo dos Santos de Oliveira Silva, Sorocaba (BR); Jean Carlos Pereira de Camargo, Piracicaba (BR); Anderson Antonio Moreno, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 201 days.

(21) Appl. No.: 16/174,966

(22) Filed: Oct. 30, 2018

(65) Prior Publication Data

US 2020/0128743 A1    Apr. 30, 2020

(51) Int. Cl.
  *A01D 45/10*  (2006.01)
  *A01D 61/02*  (2006.01)
  *A01D 41/12*  (2006.01)

(52) U.S. Cl.
  CPC .......... *A01D 45/10* (2013.01); *A01D 61/02* (2013.01); *A01D 41/1208* (2013.01)

(58) Field of Classification Search
  CPC .... A01D 45/10; A01D 61/02; A01D 41/1208; A01D 41/1217; A01D 61/00
  See application file for complete search history.

(56) References Cited

U.S. PATENT DOCUMENTS

| | | | | |
|---|---|---|---|---|
| 3,788,048 A | * | 1/1974 | Stiff | A01D 45/10 55/406 |
| 3,830,046 A | * | 8/1974 | Rollitt | A01D 45/10 56/16.5 |
| 3,863,431 A | * | 2/1975 | Fowler | A01D 45/10 56/502 |

(Continued)

FOREIGN PATENT DOCUMENTS

| | | |
|---|---|---|
| DE | 2658820 A1 | 6/1978 |
| EP | 2769614 A1 | 8/2014 |

(Continued)

OTHER PUBLICATIONS

International Search Report and Written Opinion for PCT application PCT/US2019/058809, dated Feb. 14, 2020 (11 pages).

*Primary Examiner* — Arpad Fabian-Kovacs
(74) *Attorney, Agent, or Firm* — Patrick Sheldrake; Peter Zacharias

(57) ABSTRACT

An elevator assembly for a harvester may include an elevator housing and an elevator extending within the elevator housing between a proximal end and a distal end. As such, the elevator may be configured to carry harvested crops between its proximal and distal ends. Furthermore, the elevator assembly may include a storage hopper extending from the elevator housing at a location adjacent to the distal end of the elevator. The storage hopper may include a conveyor extending within the storage hopper between a first end and a second end, with the conveyor configured to carry the harvested crops between its first and second ends towards a discharge opening of the storage hopper.

9 Claims, 4 Drawing Sheets

(56) References Cited

U.S. PATENT DOCUMENTS

| | | | | |
|---|---|---|---|---|
| 3,946,875 A | * | 3/1976 | Fowler | A01D 45/10 209/639 |
| 4,019,308 A | * | 4/1977 | Quick | A01D 45/10 56/13.9 |
| 4,121,778 A | | 10/1978 | Quick | |
| 4,147,017 A | * | 4/1979 | Cortopassi | A01D 45/006 171/14 |
| 4,154,047 A | * | 5/1979 | Quick | A01D 45/10 56/13.9 |
| 4,924,662 A | * | 5/1990 | Quick | A01D 45/10 56/12.8 |
| 5,031,392 A | * | 7/1991 | Baker | A01D 45/10 460/123 |
| 5,069,024 A | | 12/1991 | Riberio Pinto | |
| 5,092,110 A | * | 3/1992 | Dommert | A01D 45/10 209/139.1 |
| 5,488,820 A | | 2/1996 | Cannavan | |
| 5,941,768 A | * | 8/1999 | Flamme | A01D 43/07 209/135 |
| 6,125,618 A | | 10/2000 | Dillon | |
| 6,272,819 B1 | * | 8/2001 | Wendte | A01D 41/127 460/6 |
| 6,508,049 B1 | * | 1/2003 | Cox | A01D 45/10 56/10.2 R |
| 6,869,356 B2 | * | 3/2005 | Hinds | A01D 45/10 460/70 |
| 9,084,394 B2 | | 7/2015 | Roberge | |
| 9,119,346 B2 | * | 9/2015 | Vergote | A01D 45/10 |
| 10,076,076 B2 | * | 9/2018 | Craig | A01D 45/10 |
| 10,344,993 B2 | * | 7/2019 | Gettig | A01D 46/20 |
| 10,412,888 B2 | * | 9/2019 | Matway | A01D 41/1271 |
| 10,645,876 B2 | * | 5/2020 | Dugas | A01D 45/10 |
| 2015/0327438 A1 | * | 11/2015 | Cazenave | A01D 45/10 56/51 |
| 2017/0108000 A1 | * | 4/2017 | Junior | F04D 29/384 |
| 2017/0112058 A1 | | 4/2017 | Craig et al. | |
| 2017/0112063 A1 | | 4/2017 | Craig | |
| 2017/0251601 A1 | * | 9/2017 | Dugas | A01F 12/444 |
| 2019/0082600 A1 | * | 3/2019 | Nicora | A01D 45/10 |

FOREIGN PATENT DOCUMENTS

| | | | | |
|---|---|---|---|---|
| EP | 3298875 A1 | 3/2018 | | |
| WO | WO2015156774 | 10/2015 | | |
| WO | WO-2018037543 A1 | * | 3/2018 | A01D 45/10 |
| WO | 2018106563 A1 | 6/2018 | | |
| WO | WO2018106563 | 6/2018 | | |

* cited by examiner

ELEVATOR ASSEMBLY FOR AN AGRICULTURAL HARVESTER WITH A STORAGE HOPPER HAVING A CONVEYOR THEREIN

FIELD OF THE INVENTION

The present disclosure generally relates to agricultural harvesters, such as sugar cane harvesters, and, more particularly, to an elevator assembly for an agricultural harvester with a storage hopper having a conveyor therein and related methods for operating the harvester using the conveyor.

BACKGROUND OF THE INVENTION

Typically, agricultural harvesters are accompanied by a receiver for harvested crops, such as a truck that is driven beside or behind the harvester, or a wagon towed by a truck or tractor. An unloading conveyor or elevator extends from the harvester and is operable during the harvesting operation as it moves along the field for unloading the harvested crops to the accompanying receiver.

Some harvesters, particularly combine harvesters, have an on-board crop carrying capability, such as a large grain tank, so as to not need to be constantly accompanied by a receiver for the harvested crops. Other harvesters have only limited on-board carrying capability and require substantially constant accompaniment by an external receiver or storage device. For instance, sugar cane harvesters have an elongate, upwardly inclined elevator that utilizes one or more circulating chains to convey paddles or other crop carrying elements upwardly along an upwardly facing top span of the elevator, and downwardly along a downwardly facing bottom span of the elevator in an endless loop. Harvested sugar canes are typically cut into shorter billets and then carried by the paddles upwardly along the top span of the elevator and for subsequent discharge from the distal end of the elevator into the accompanying receiver, such as a billet cart.

When an external receiver for a sugarcane harvester is absent or is otherwise not properly positioned relative to the harvester, the unloading elevator must be stopped to prevent the conveyed billets from being discharged onto the ground. This situation can arise under a variety of conditions, such as if the accompanying receiver is full and must leave the harvester to unload. As another example, the receiver may often be a towed wagon that (along with its towing vehicle) defines a larger turning radius that the harvester itself. In such instances, when a turn is being executed at the end of the field, the receiver may not be immediately present for receiving the harvested crops. As a result, the harvester may have to pause operation until the receiver is able to be properly positioned relative to the harvester. In either situation, there is significant loss in the productivity of the harvester.

Accordingly, an improved elevator assembly for an agricultural harvester that has a storage hopper to allow for continued harvesting in the absence of an accompanying receiver would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an elevator assembly for a harvester. The elevator assembly may include an elevator housing and an elevator extending within the elevator housing between a proximal end and a distal end. As such, the elevator may be configured to carry harvested crops between its proximal and distal ends. Furthermore, the elevator assembly may include a storage hopper extending from the elevator housing at a location adjacent to the distal end of the elevator. The storage hopper may include a conveyor extending within the storage hopper between a first end and a second end, with the conveyor configured to carry the harvested crops between its first and second ends towards a discharge opening of the storage hopper.

In another aspect, the present subject matter is directed to a method for operating a harvester. The harvester may include an elevator assembly having an elevator extending between a proximal end and a distal end. The elevator assembly may further include a storage hopper extending from the elevator housing at a location adjacent to the distal end of the elevator. The storage hopper may include a conveyor extending within the storage hopper between a first end and a second end. The method may include initially operating the harvester in a discharge harvesting mode such that harvested crops are expelled from the distal end of the elevator, conveyed between the first and second ends of the conveyor, and subsequently discharged from the harvester through a discharge opening defined by the storage hopper. The method may also include receiving an operator input associated with operating the harvester in a storage harvesting mode. Furthermore, upon receipt of the operator input, the method may include at least one of reducing a speed of the conveyor or halting operation of the conveyor such that the harvested crops expelled from the distal end of the elevator accumulate within a storage volume defined by storage hopper.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof directed to one of ordinary skill in the art, is set forth in the specification, which makes reference to the appended figures, in which.

Figure 1:
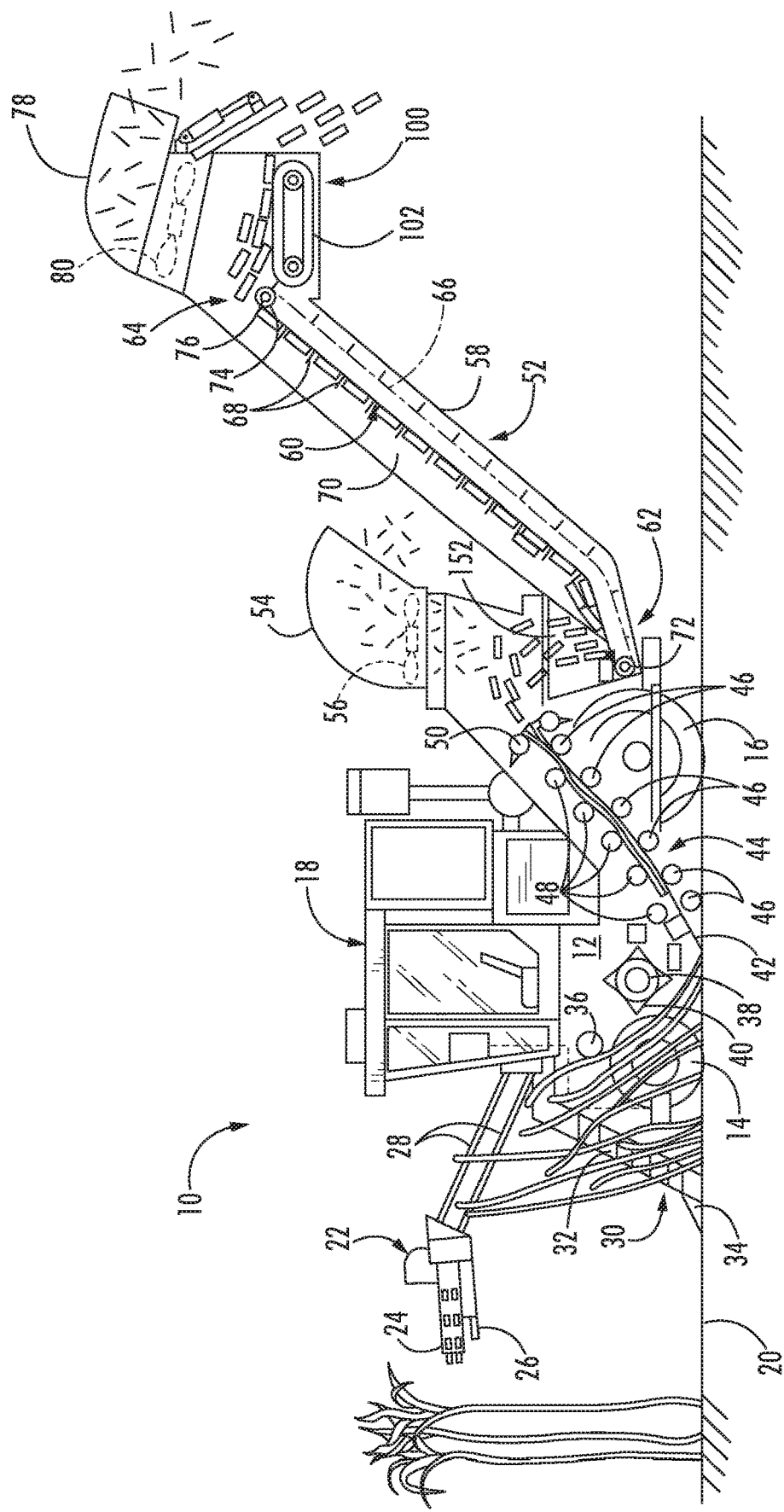
FIG. 1 illustrates a simplified, side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an elevator assembly for an agricultural harvester that includes a storage hopper at its distal end for temporarily storing harvested crops therein. Specifically, in several embodiments, the storage hopper may include a conveyor positioned therein and configured to carry the harvested crops received from an elevator of the elevator assembly towards a discharge opening of the storage hopper. As such, when an external receiver or storage device is properly positioned relative to the harvester, the conveyor may be driven in a manner that carries the harvested crops toward the discharge opening for ejection from the harvester into the external receiver. For example, in one embodiment, the speed of the conveyor may be variable such that the distance that the harvested crops are ejected from the discharge opening is adjustable. In this regard, the distance between the harvester and the external receiver or storage device may be varied without necessitating adjustment of the position of the elevator relative to one or more other components of the elevator assembly. Conversely, when the external receiver or storage device is not properly positioned relative to the harvester, the speed of the conveyor may be reduced and/or the operation of the conveyor may be halted such that the harvested crops accumulate within a storage volume defined by the storage hopper without discontinuing operation of the elevator and/or the remainder of the harvester.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12), which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester 10.

Additionally, the harvester 10 may include various components for cutting, processing, cleaning, and discharging sugar cane as the cane is harvested from an agricultural field 20. For instance, the harvester 10 may include a topper assembly 22 positioned at its front end to intercept sugar cane as the harvester 10 is moved in the forward direction. As shown, the topper assembly 22 may include both a gathering disk 24 and a cutting disk 26. The gathering disk 24 may be configured to gather the sugar cane stalks so that the cutting disk 26 may be used to cut off the top of each stalk. As is generally understood, the height of the topper assembly 22 may be adjustable via a pair of arms 28 hydraulically raised and lowered, as desired, by the operator.

Additionally, the harvester 10 may include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugar cane stalks for harvesting. Moreover, as shown in FIG. 1, the harvester 10 may include a knock-down roller 36 positioned near the front wheels 14 and a fin roller 38 positioned behind the knock-down roller 36. As the knock-down roller 36 is rotated, the sugar cane stalks being harvested are knocked down while the crop divider 30 gathers the stalks from agricultural field 20. Further, as shown in FIG. 1, the fin roller 38 may include a plurality of intermittently mounted fins 40 that assist in forcing the sugar cane stalks downwardly. As the fin roller 38 is rotated during the harvest, the sugar cane stalks that have been knocked down by the knock-down roller 36 are separated and further knocked down by the fin roller 38 as the harvester 10 continued to be moved in the forward direction relative to the field 20.

Referring still to FIG. 1, the harvester 10 may also include a base cutter assembly 42 positioned behind the fin roller 30. As is generally understood, the base cutter assembly 42 may include blades (not shown) for severing the sugar cane stalks as the cane is being harvested. The blades, located on the periphery of the assembly 42, may be rotated by a hydraulic motor (not shown) powered by the vehicle's hydraulic system. Additionally, in several embodiments, the blades may be angled downwardly to sever the base of the sugar cane as the cane is knocked down by the fin roller 30.

Moreover, the harvester 10 may include a feed roller assembly 44 located downstream of the base cutter assembly 42 for moving the severed stalks of sugar cane from base cutter assembly 42 along the processing path. As shown in FIG. 1, the feed roller assembly 44 may include a plurality of bottom rollers 46 and a plurality of opposed, top pinch rollers 48. The various bottom and top rollers 46, 48 may be used to pinch the harvested sugar cane during transport. As the sugar cane is transported through the feed roller assembly 44, debris (e.g., rocks, dirt, and/or the like) may be allowed to fall through bottom rollers 46 onto the field 20.

In addition, the harvester 10 may include a chopper assembly 50 located at the downstream end of the feed roller assembly 44 (e.g., adjacent to the rearward-most bottom and top feed rollers 46, 48). In general, the chopper assembly 50 may be used to cut or chop the severed sugar cane stalks into pieces or "billets" that may be, for example, six (6) inches long. The billets may then be propelled towards an elevator assembly 52 of the harvester 10 for delivery to an external receiver or storage device (not shown).

As is generally understood, pieces of debris (e.g., dust, dirt, leaves, etc.) separated from the sugar cane billets may be expelled from the harvester 10 through a primary extractor 54, which is located behind the chopper assembly 50 and is oriented to direct the debris outwardly from the harvester 10. Additionally, an extractor fan 56 may be mounted at the base of the primary extractor 54 for generating a suction force or vacuum sufficient to pick up the debris and force the debris through the primary extractor 54. The separated or cleaned billets, heavier than the debris being expelled through the extractor 54, may then fall downward to the elevator assembly 52.

As shown in FIG. 1, the elevator assembly 52 may generally include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugar cane billets on the elevator 60 as the billets are elevated along a top span 70 of the elevator 60 defined between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60. Furthermore, in one embodiment, the distal end 64 of the elevator 60 may be fixed relative to the elevator housing 58 such that the orientation or angle of the elevator 60 is generally not adjustable relative to the elevator housing 58. However, in alternative embodiments, the distal end 64 of the elevator 60 may be adjustable relative to the elevator housing 58.

Moreover, pieces of debris (e.g., dust, dirt, leaves, etc.) separated from the elevated sugar cane billets may be expelled from the harvester 10 through a secondary extractor 78 coupled to the rear end of the elevator housing 58. As shown in FIG. 1, the secondary extractor 78 may be located adjacent to the distal end 64 of the elevator 60 and may be oriented to direct the debris outwardly from the harvester 10. Additionally, an extractor fan 80 may be mounted at the base of the secondary extractor 78 for generating a suction force or vacuum sufficient to pick up the debris and force the debris through the secondary extractor 78. The separated, cleaned billets, heavier than the debris expelled through the extractor 78, may then fall from the distal end 64 of the elevator 60. Typically, the billets may then be ejected from the harvester 10 through a discharge opening 82 of the elevator assembly 52 into an external receiver or storage device (not shown), such as a sugar cane billet cart. However, in alternative embodiments, the harvester 10 may not include the secondary extractor 78.

During operation, the harvester 10 is traversed across the agricultural field 20 for harvesting sugar cane. After the height of the topper assembly 22 is adjusted via the arms 28, the gathering disk 24 on the topper assembly 22 may function to gather the sugar cane stalks as the harvester 10 proceeds across the field 20, while the cutter disk 26 severs the leafy tops of the sugar cane stalks for disposal along either side of harvester 10. As the stalks enter the crop divider 30, the ground shoes 34 may set the operating width to determine the quantity of sugar cane entering the throat of the harvester 10. The spiral feed rollers 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugar cane stalks are conveyed rearwardly by the bottom and top feed rollers 46, 48, which compress the stalks, make them more uniform, and shake loose debris to pass through the bottom rollers 46 to the field 20. At the downstream end of the feed roller assembly 44, the chopper assembly 50 cuts or chops the compressed sugar cane stalks into pieces or billets (e.g., 6 inch cane sections). Airborne debris or chaff (e.g., dust, dirt, leaves, etc.) separated from the sugar cane billets is then extracted through the primary extractor 54 using suction created by the extractor fan 56. The separated/cleaned billets then fall downwardly into the elevator assembly 52 and travel upwardly via the elevator 60 from its proximal end 62 to its distal end 64. During normal operation, once the billets reach the distal end 64 of the elevator 60, the billets are carried to the discharge opening 82 for ejection from the harvester 10 to an external receiver or storage device. Similar to the primary extractor 54, chaff is blown out from harvester 10 through the secondary extractor 78 with the aid of the extractor fan 80.

Additionally, in accordance with aspects of the present subject matter, the elevator assembly 52 may also include a storage hopper 100 coupled to the elevator housing 58 at a location adjacent to the distal end 64 of the elevator 60 (e.g., at a location below the distal end 64 of the elevator 60 and the secondary extractor 78). As shown in FIG. 1, the storage hopper 100 may be configured to at least partially define the discharge opening 82 of the elevator assembly 52. As will be described in greater detail below, the storage hopper 100 may include a conveyor 102 configured to carry the billets received from the elevator 60 towards the discharge opening 82 for ejection from the harvester 10. In this regard, when the harvester 10 is operated in its typical unloading mode (e.g., referred to hereinafter as its discharge harvesting mode), the conveyor 102 may be driven in a manner that carries the billets expelled from the distal end 64 of the elevator 60 toward the discharge opening 82 for ejection from the harvester 10. The ejected billets may fall into an associated external receiver or storage device. However, when the harvester 10 is being operated in a storage harvesting mode, the speed of the conveyor 102 may be reduced or the operation of the conveyor 102 may be halted. As such, the billets expelled from the distal end 64 of the elevator 60 may accumulate within a storage volume 104 defined by the storage hopper 100 for temporary storage therein.

Figure 2:
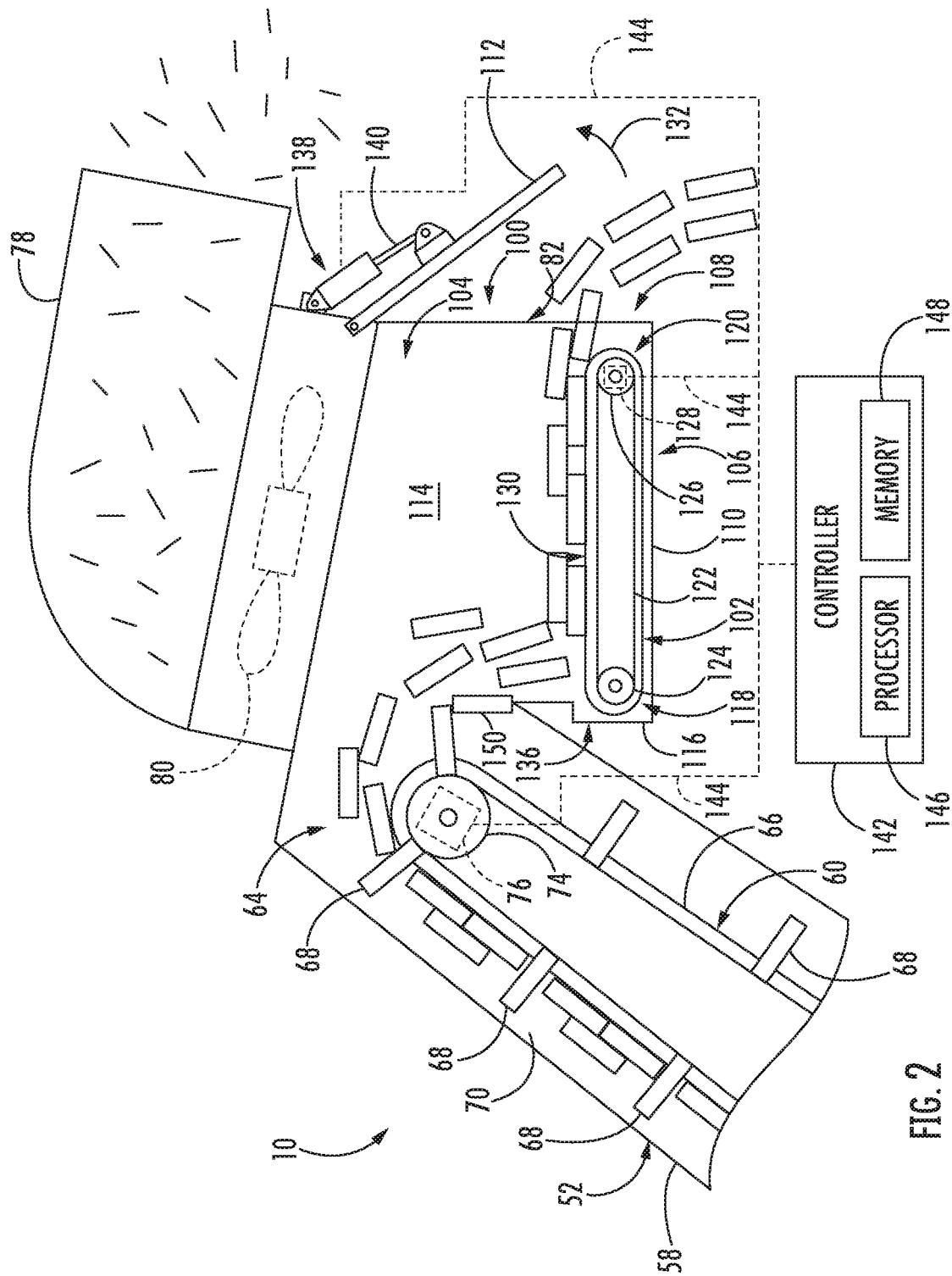
FIG. 2 illustrates a side view of a distal portion of an elevator assembly of the harvester shown in FIG. 1, particularly illustrating components of a storage hopper of the elevator assembly when the harvester is being operated in a discharge harvesting mode in which harvested crops are discharged from the elevator assembly.
Figure 3:
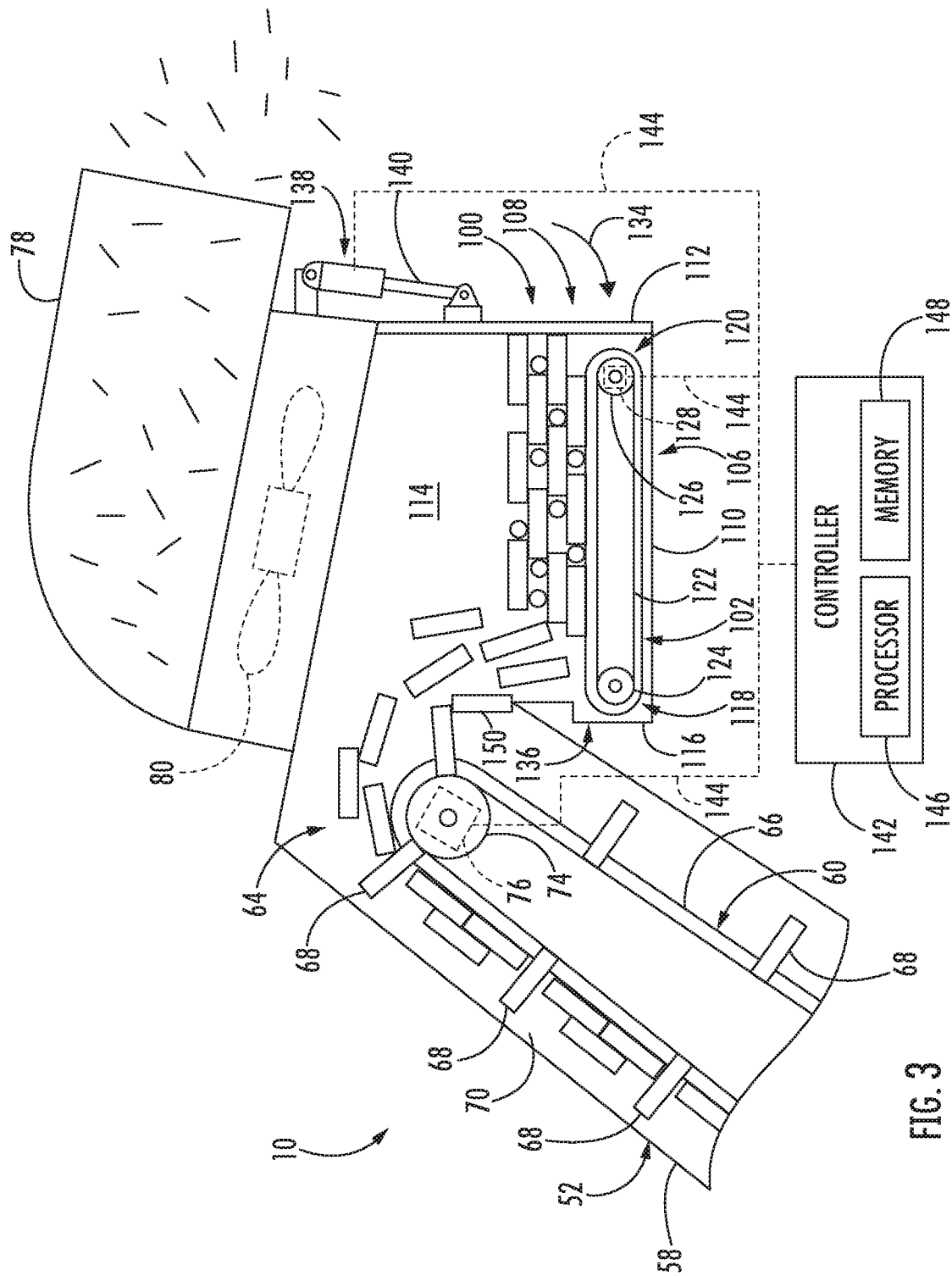
FIG. 3 illustrates another side view of the distal portion of the elevator assembly shown in FIG. 2, particularly illustrating the components of the storage hopper when the harvester is being operated in a storage operating mode in which harvested crops to be temporarily stored within the storage hopper.

Referring now to FIGS. 2 and 3, side views of a distal portion of the elevator assembly 52 shown in FIG. 1 are illustrated in accordance with aspects of the present subject matter, particularly illustrating the storage hopper 100 located adjacent to the distal end 64 of the elevator 60. Specifically, FIG. 2 illustrates the storage hopper 100 when the harvester 10 is being operated in its discharge harvesting mode. Similarly, FIG. 3 illustrates the storage hopper 100 when the harvester 10 is being operated in its storage harvesting mode.

In several embodiments, the storage hopper 100 may be positioned at or adjacent to the distal end 64 of the elevator 60 such that billets are expelled from the elevator 60 at its distal end 64 downwardly and rearwardly into the storage hopper 100. For instance, as shown in FIGS. 2 and 3, the storage hopper 100 may extend downwardly and rearwardly from the elevator housing 58 such that the hopper 100 includes a bottom side 106 located below the distal end 64 of the elevator 60 and a rear side 108 (FIG. 2) positioned below the secondary extractor 78. The storage hopper 100 may include a bottom wall 110 positioned along the bottom side 106 of the hopper 100 and a rear door 112 movable relative to the rear side 108 of the hopper 100. The storage hopper 100 may also include a pair of sidewalls 114 (only one of which is shown) extending outwardly from the elevator housing 58 to the bottom and rear sides 106, 108 of the hopper 100. Additionally, as shown in FIGS. 2 and 3, the storage hopper 100 may include a front wall 116 spaced forward of the rear side 108 of the hopper 100. In one embodiment, the discharge opening 82 of the elevator assembly 52 may be defined along the rear side 108 of the hopper 100. However, it should be appreciated that, in alternative embodiments, the storage hopper 100 may have any other suitable configuration.

Furthermore, the storage hopper 100 may include the conveyor 102 positioned adjacent to the bottom side 106 of the hopper 100. Specifically, in several embodiments, the conveyor 102 may extend within the storage hopper 100 between a first, forward end 118 and a second, rear end 120. For example, as shown, in one embodiment, the first end 118 of the conveyor 102 may be positioned adjacent to the distal end 64 of the elevator 60 and the forward wall 116 of the storage hopper 100, while the second end 120 of the conveyor 102 may be positioned adjacent to the rear side 108 and discharge opening 82 of the hopper 100. Moreover, as shown, the conveyor 102 may be positioned vertically below the distal end 64 of the elevator 60. Additionally, the conveyor 102 may include a conveyor belt 122 and forward and rear rollers 124, 126 positioned at its first and second ends 118, 120, respectively. In this regard, a conveyor motor 128 (e.g., an hydraulic motor, electric motor, and/or the like) may be coupled to one of the rollers (e.g., the rear roller 124) for driving the conveyor belt 122, thereby allowing the belt 122 to travel in an endless loop between the first and second ends 118, 120 of the conveyor 102. As will be described below, the sugar cane billets discharged from the elevator 60 may fall onto a top span 130 of the conveyor belt 122. Such billets may, in turn, be carried or otherwise transported from the first end 118 of the conveyor 102 to the second end of the conveyor 102 as the conveyor belt 122 is moved relative to the rollers 124, 126.

Additionally, in several embodiments, the rear door 112 may be movable between an opened position (FIG. 2) and a closed position (FIG. 3). More specifically, when it is desired to operate the harvester 10 in its discharge harvesting mode, the rear door 112 may be moved to its opened position. For instance, as shown in FIG. 2, when in the discharge position, the rear door 112 may be pivoted relative to the rear side 110 of the hopper 100 away from both the bottom and front sides 110, 116 (e.g., in the direction of arrow 132 in FIG. 2) to expose the discharge opening 82 defined along the rear side 108 of the hopper 100. Moreover, as indicated above, when in the discharge harvesting mode, the conveyor 102 may be driven in a manner that carries the billets expelled from the distal end 64 of the elevator 60 toward the discharge opening 82. As such, the speed of the conveyor belt 122 may force or launch the billets thereon through the discharge opening 82, thereby ejecting such billets from the elevator assembly 52. Additionally, in one embodiment, the speed of the conveyor belt 122 may by varied (e.g., by varying the speed at which the rear roller 126 is driven by the conveyor motor 128) such that the distance that the billets are ejected from the discharge opening 82 is adjustable. In this regard, by varying the speed of the conveyor belt 122, the distance between the discharge opening 82 and the associated external storage device may be adjusted without requiring adjustment of the orientation or angle of the elevator 60 relative to the elevator housing 58.

Moreover, when it is desired to operate the harvester 10 in its storage harvesting mode, the rear door 112 may be moved to its closed position. For instance, as shown in FIG. 3, when in the storage position, the rear door 112 may be pivoted relative to the rear side 110 of the hopper 100 towards both the bottom and front walls 110, 116 (e.g., in the direction of arrow 134) until the rear door 112 contacts or is otherwise positioned directly adjacent to the bottom wall 110, thereby covering the discharge opening 82 defined along the rear side 108 of the hopper 100. When the rear door 112 is located at such position, the storage hopper 100 may be configured to define a storage volume 104 for storing the billets expelled from the distal end 64 of the elevator 60. Specifically, as shown in FIG. 3, the storage volume 104 may extend between a forward end 136 of the storage hopper 100 defined by the front wall 116 and the rear side 108 defined by the rear door 112. Additionally, the storage volume 104 may extend crosswise between the opposed sidewalls 114 of the hopper 100 and vertically between the secondary extractor 78 and the conveyor 102. Thus, billets expelled from the distal end 64 of the elevator 60 may fall downwardly onto the bottom of the storage volume 104 defined by the conveyor 102 and pile up vertically on the conveyor 102 and within the storage volume 104 between the front wall 116 and the rear door 112 and the opposed sidewalls 114. Additionally, as indicated above, when in the storage harvesting mode, the speed of the conveyor 102 may be reduced or the operation of the conveyor 102 may be halted to prevent movement of the billets toward the discharge opening 82. In one embodiment, the speed of the conveyor 102 may be reduced for a predetermined time period before the operation of the conveyor 102 is halted.

It should be appreciated that the storage volume 104 defined by the storage hopper 100 may generally correspond to any suitable volume sufficient to store a desired amount of billets within the hopper 100. However, in several embodiments, the storage hopper 100 may be configured such that the storage volume 104 is substantially equal to the maximum storage volume defined by the top span 70 of the elevator 60 (i.e., the top side of the elevator 60 along which the billets are conveyed between the elevator's proximal and distal ends 62, 64). As used herein, the storage volume 104 defined by the storage hopper 100 may be considered to be substantially equal to the maximum storage volume defined by the top elevator span 70 if the storage volume 104 is within +/−20% of the maximum storage volume defined by the top elevator span 70, such as within +/−10% of the maximum storage volume defined by the top elevator span 70 or within +/−5% of the maximum storage volume defined by the top elevator span 70 and/or any other subranges therebetween.

As shown in FIGS. 2 and 3, in several embodiments, the elevator assembly 52 may include a rear door actuator 138 configured to move the rear door 112 between its opened and closed positions. In general, the rear door actuator 138 may correspond to any suitable actuation mechanism and/or device. For instance, in one embodiment, the rear door actuator 138 may correspond to a linear actuator, such as a fluid-driven cylinder actuator or an electric actuator (e.g., a solenoid-activated actuator). Specifically, as shown in FIGS. 2 and 3, the rear door actuator 138 may be coupled to a portion of the secondary extractor 78 and may include a drive rod 140 secured to a portion of the rear door 112. In such an embodiment, by linearly actuating the drive rod 140 in one direction or the other, the rear door 112 may be pivoted relative to the rear side 106 of the hopper 100 between its opened and closed positions. Alternatively, the rear door actuator 138 may correspond to any other suitable actuation mechanism and/or device, such as any other suitable linear actuator (e.g., a gear and rack assembly) and/or the like.

It should be appreciated that, in several embodiments, the operation of the conveyor motor 128 and/or the rear door actuator 138 may be configured to be electronically controlled via a controller 142 of the harvester 10. For instance, as shown in FIGS. 2 and 3, the controller 142 may be communicatively coupled to the conveyor motor 128 and the rear door actuator 138 via one or more communicative links 144, such as a wired connection and/or a wireless connection. In the event that the conveyor motor 128 and/or the rear door actuator 138 corresponds to a fluid-driven component(s), the controller 142 may, instead, be communicatively coupled to suitable electronically controlled valves and/or other suitable fluid-related components for controlling the operation of the component(s) 128, 138. Regardless, by providing the disclosed communicative links between the controller 142 and the component(s) 130, 138, the controller 142 may be configured to control the operation of the component(s) 130, 138 based on inputs received from the operator of the harvester 10. For instance, as will be described below, the controller 142 may be configured to receive operator inputs associated with the desired operating mode for the harvester 10. Specifically, the operator may provide an operator input indicating the desire to switch the operation of the harvester 10 from the discharge harvesting mode to the storage harvesting mode. In such instance, the controller 142 may be configured to electronically control the operation of the conveyor motor 128 to reduce the speed of and/or halt the operation of the conveyor 102 and electronically control the operation of the rear door actuator 138 to move the rear door 112 to its closed position. Similarly, if the operator provides an operator input indicating the desire to switch the operation of the harvester 10 from the storage harvesting mode back to the discharge harvesting mode, the controller 142 may be configured to electronically control the operation of the conveyor motor 128 such that the conveyor belt 122 is driven at the desired or selected speed and electronically control the operation of the rear door actuator 138 to move the rear door 112 from its closed position to its opened position.

In general, the controller 142 may correspond to any suitable processor-based device known in the art, such as a computing device or any suitable combination of computing devices. Thus, in several embodiments, the controller 142 may include one or more processor (s) 146 and associated memory device(s) 148 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 148 of the controller 142 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 148 may generally be configured to store suitable computer-readable instructions that, when implemented by the processor(s) 146, configure the controller 142 to perform various computer-implemented functions, such as one or more aspects of the method 200 described below with reference to FIG. 4. In addition, the controller 142 may also include various other suitable components, such as a communications circuit or module, one or more input/output channels, a data/control bus and/or the like.

It should be appreciated that the controller 142 may correspond to an existing controller of the harvester 10 or the controller 142 may correspond to a separate processing device. For instance, in one embodiment, the controller 142 may form all or part of a separate plug-in module that may be installed within the harvester 10 to allow the present subject matter to be implemented without requiring additional software to be uploaded onto existing control devices of the harvester 10.

It should also be appreciated that the controller 142 may be configured to electronically control any other suitable components of the harvester 10 in addition to the above-described components 128, 138. For instance, as shown in FIGS. 2 and 3, the controller 142 may be communicatively coupled to the elevator motor 76 for controlling the operation of the elevator 60. For instance, the controller 142 may electronically control the operation of the elevator motor 76 to automatically adjust the operational speed of the elevator 60 and/or the start/stop the elevator 60, as desired.

Referring still to FIGS. 2 and 3, in several embodiments, a sealing device 150 may be provided at the top end of the front wall 116 for sealing the gap defined between the front wall 116 and the paddles 68 of the elevator 60 as the paddles 68 are conveyed past the wall 116. For instance, in one embodiment, the sealing device 150 may correspond to a flexible sealing member, such as a brush seal or an elastic seal. In such an embodiment, the sealing device 150 may be configured to flex or bend as the paddles 68 are conveyed past the front wall 116. By providing the sealing device 150, the billets stored within the storage volume 104 of the hopper 100 when the harvester 10 is operating in its storage harvesting mode may be prevented from tumbling over the top of the front wall 116 and falling from the hopper 100.

Figure 4:
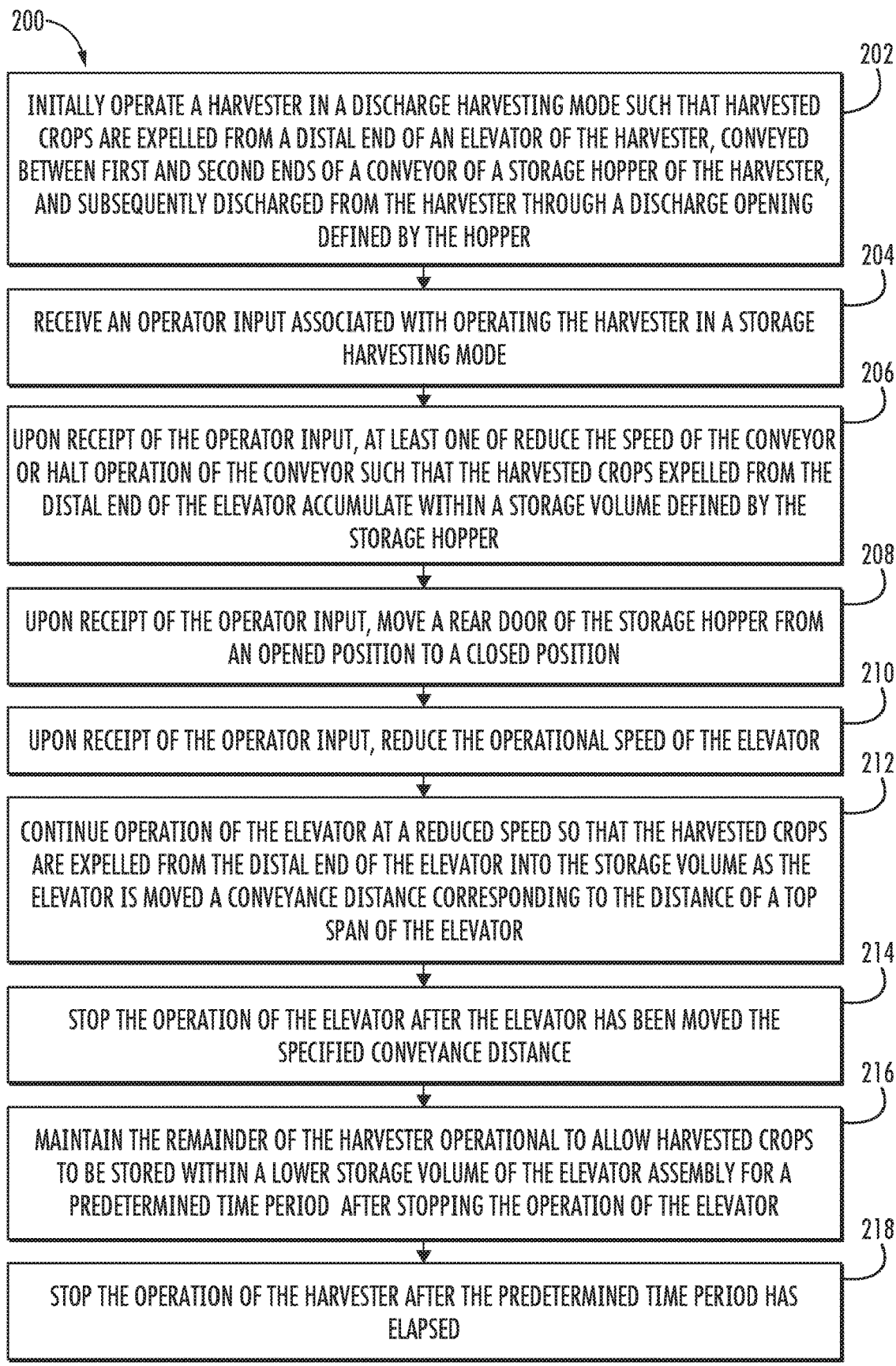
FIG. 4 illustrates a flow diagram of one embodiment of a method for operating a harvester in accordance with aspects of the present subject matter.

Referring now to FIG. 4, a flow diagram of one embodiment of a method 200 for operating a harvester is illustrated in accordance with aspects of the present subject matter. In general, the method 200 will be described herein with reference to the embodiment of the harvester 10 described above with reference to FIGS. 1-3. However, it should be appreciated by those of ordinary skill in the art that the disclosed method 200 may generally be implemented with any harvester 10 having any suitable harvester configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may initially operating a harvester in a discharge harvesting mode such that harvested crops are expelled from a distal end of an elevator of the harvester, conveyed between first and second ends of a conveyor of a storage hopper of the harvester, and subsequently discharged from the harvester through a discharge opening defined by the storage hopper. Specifically, as indicated above, when operating the harvester 10 in the discharge harvesting mode, the rear door 112 may be moved to its opened position shown in FIG. 2 and the conveyor 102 may be driven (e.g., by the conveyor motor 128) in a manner that carries billets expelled from the distal end 64 of the elevator 60 from the first end 118 of the conveyor 102 to the second end 122 of the conveyor 102. As such, the speed of the conveyor 102 may launch or otherwise eject the from the elevator assembly 52 via the discharge opening 82. The billets discharged from the elevator assembly 52 may then fall into an external receiver or storage device, such as a sugar cane billet cart.

Additionally, at (204), the method 200 may include receiving an operator input associated with switching the operation of the harvester from its discharge harvesting mode to its storage harvesting mode. For instance, as indicated above, it may be desirable to operate the harvester 10 in its storage harvesting mode when an associated external storage device is not properly positioned relative to the discharge opening 82 for collecting the discharged billets, such as when rotating the billet carts and/or when turning/resuming harvesting at the end of row without the billet cart being in position. In such instance(s), the operator may be allowed to provide a suitable operator input to the vehicle's controller 142 indicating the desire to switch operation of the harvester 10 to the storage harvesting mode. For instance, a suitable input device (e.g., a button, knob, lever, switch, etc.) may be provided within the operator's cab 18 to allow the operator to provide the operator input to the controller 142.

Moreover, at (206), the method 200 may include, upon receipt of the operator input, at least one of reducing a speed of the conveyor or halting operation of the conveyor such that the harvested crops expelled from the distal end of the elevator accumulate within a storage volume defined by the storage hopper. Specifically, in several embodiments, when operating the harvester 10 in the storage harvesting mode, the speed of the conveyor 102 may be reduced and/or the operation of the conveyor 102 may be halted such that the billets expelled from the distal end 64 of the elevator 60 accumulate within a storage volume 104 defined by the storage hopper 100. For instance, as indicated above, the vehicle's controller 142 may be configured to automatically control the operation of the conveyor actuator 128 in a manner that reduces the speed of and/or halts the operation of the conveyor 102 such that the conveyor belt 122 is stationary relative to the rollers 124, 126 upon receiving the input from the operator indicating his/her desire to operate the harvester 10 in the storage harvesting mode.

Further, at (208), the method 200 may include, upon receipt of the operator input, moving a rear door of the storage hopper from its opened position to its closed position. Specifically, in several embodiments, when operating the harvester 10 in the storage harvesting mode, the rear door 112 may be configured to be moved to its closed position so that the storage hopper 100 defines the storage volume 104 for receiving the billets expelled from the distal end 64 of the elevator 60. As indicated above, the vehicle's controller 142 may be configured to automatically control the operation of the rear door actuator 138 in a manner that moves the rear door 112 to its closed position upon receiving the input from the operator indicating his/her desire to operate the harvester 10 in the storage harvesting mode.

Referring still to FIG. 4, at (210), the method 200 may also include, upon receipt of the operator input, reducing an operational speed of the elevator. Specifically, in addition to reducing the speed of and/or halting operation of the conveyor 102 and/or moving the rear door 112, the operational speed of the elevator 60 may be reduced from its normal operational speed (e.g., the operational speed of the elevator 60 when the harvester 10 is operated in its discharge harvesting mode) to a decreased operational speed. In one embodiment, the elevator speed may be reduced to a predetermined operational speed, such as a speed ranging from about 10% to about 25% of the normal operational speed of the elevator 60. Alternatively, the decreased operational speed of the elevator 60 may be determined as a function of one or more operational parameters of the harvester 10, such as the current yield of the harvester 10, the current feed rate of the harvester 10, and/or the current ground speed of the harvester 10. As indicated above, the operational speed of the elevator 60 may be automatically controlled by the vehicle's controller 142 (e.g., by controlling the operation of the elevator motor 76).

Additionally, at (212), the method 200 may include continuing operation of the elevator at the reduced speed so that the harvested crops are expelled from the elevator into the storage volume defined by the storage hopper as the elevator is moved a conveyance distance corresponding to the distance of the top elevator span. Specifically, in several embodiments, after reducing the speed of and/or halting operation of the conveyor 102 and/or moving the rear door 112 to its closed position, the elevator 60 may be operated at the reduced operational speed until the elevator 60 has moved one half of its total travel distance (i.e., the conveyance distance defined along the top span 70 of the elevator 60 between its proximal and distal ends 62, 64). In doing so, as the elevator 60 is moved such conveyance distance, the billets initially contained within the top elevator span 70 may be dumped into the storage volume 104 while concurrently filling the paddles 68 moving into the top elevator span 70 to their maximum fill level.

Moreover, at (214), the method 200 may include stopping the operation of the elevator after the elevator has been moved the specified conveyance distance. Specifically, once the elevator 60 has moved the conveyance distance defined along the top span 70 of the elevator 60 between its proximal and distal ends 62, 64 (thereby allowing both the storage hopper 100 and the top elevator span 70 to be filled with billets), the elevator operation may be halted. As indicated above, the elevator 60 may be automatically stopped by the vehicle's controller 142 (e.g., by controlling the operation of the elevator motor 76). In such an embodiment, the controller 142 may be configured to determine when the elevator 60 has been moved the specified conveyance distance by monitoring the time across which the elevator 60 has been operated at its reduced speed and/or by monitoring the actual distance across which the elevator 60 has been conveyed.

Further, at (216), the method 200 may include maintaining the remainder of the harvester operational to allow harvested crops to be stored within a lower storage volume of the elevator assembly for a predetermined time period after stopping the operation of the elevator. Specifically, upon stopping the elevator 60, the harvester 10 may continue to be used to harvest sugar cane for a given time period (e.g., three to ten seconds). In such instance, the harvested billets may be stored within a lower storage hopper 152 (FIG. 1) defined at or adjacent to the proximal end 62 of the elevator 60.

Additionally, at (218), the method 200 may include stopping the operation of the harvester after the predetermined time period has elapsed. Specifically, following the continued operation of the harvester 10 for the predetermined time period after stopping the elevator 60, it may be assumed that the elevator assembly 62 is at full capacity. In such instance, the harvester 10 may be stopped to discontinue harvesting of the sugar cane.

It should be appreciated that the disclosed method 200 may allow a harvester 10 to be operated without unloading harvested crops for a significant period of time (e.g., fifteen to forty seconds depending on the throughput of the harvester 10 and the length/capacity of the elevator 60), thereby providing sufficient time to allow an external receiver or storage device (e.g., a billet cart) to be positioned relative to the harvester 10. Once the external receiver or storage device is positioned relative to the harvester 10, operation of the conveyor 102 may be initiated and its speed may be set based on the distance between the discharge opening 82 and the external receiver. As such, the billets ejected from the harvester 10 may be received by the external receiver or storage device even if the distance between the discharge opening 82 and the external receiver has changed since the last time the harvester 10 was operated in the discharge operating mode. In general, it is anticipated that the external storage device may be properly positioned relative to the harvester 10 in the time period required for the elevator 60 to be moved the conveyance distance defined along the top span 70 of the elevator 60 between its proximal and distal ends 62, 64. As such, in most instances, it is believed that the operation of the harvester 10 can be switched back to its discharge harvesting mode prior to stopping the operation of the elevator 60. However, in the event that the external storage device is not properly positioned relative to the harvester 10 prior to such point, the remainder of the disclosed method 200 (e.g., method elements 214-218) may be implemented to provide for continued, temporary operation of the harvester until the eternal storage device is in place.

It is to be understood that the steps of the method 200 are performed by the controller 142 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 142 described herein, such as the method 200, is implemented in software code or instructions which are tangibly stored on a tangible computer readable medium. The controller 142 loads the software code or instructions via a direct interface with the computer readable medium or via a wired and/or wireless network. Upon loading and executing such software code or instructions by the controller 142, the controller 142 may perform any of the functionality of the controller 142 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An elevator assembly for a harvester, comprising:
   an elevator extending between a proximal end and a distal end and having a first drive roller configured for driving the elevator, the elevator configured to carry harvested crops; and
   a storage hopper located adjacent a distal end of the elevator and positioned to receive crop therefrom, the storage hopper comprising a conveyor extending within a cavity of the storage hopper between a first end and a second end, the conveyor having a second drive roller configured to drive the conveyer configured to carry the harvested crops towards a discharge opening of the storage hopper,
   a controller configured to control the first and second drive rollers, wherein the second drive roller is controllable by the controller separately from the first drive roller, wherein in a storage harvesting mode the controller is configured to operate the first and second drive rollers such that the conveyer is at least one of stopped or the movement is reduced with respect to the movement of the elevator.

2. The elevator assembly of claim 1, wherein the storage hopper further comprises a rear door movable by an actuator connected to the door between an opened position and a closed position to control the opening of the discharge opening of the storage hopper, wherein in an open position the rear door is moved way from the discharge opening of the storage hopper such that the harvested crops can pass through the discharge opening, and a closed position, wherein in the closed position the rear door is at least partially covering the discharge opening of the storage hopper.

3. The elevator assembly of claim 2, wherein, when the rear door is moved to the closed position by the actuator, the rear door and the storage hopper are configured to block the disclosure opening and the controller is configure to stop the conveyer such that incoming crop from the elevator is accumulated within the storage hopper.

4. The elevator assembly of claim 2, wherein, when the elevator assembly is being operated by the controller in a discharge harvesting mode, the rear door is moved by the actuator to the opened position and the conveyor is driven to carry the harvested crops toward the discharge opening.

5. The elevator assembly of claim 2, wherein, when the elevator assembly is being operated by the at least one controller in the storage harvesting mode, the rear door is moved by the actuator to the closed position and the controller adjusts the drive such that at least one of a speed of the conveyor is reduced or operation of the conveyor is halted such that the harvested crops accumulate within a storage volume defined by the storage hopper.

6. The elevator assembly of claim 1, wherein the first end of the conveyor is positioned adjacent to the elevator and the second end of the conveyor is positioned adjacent to a discharge opening of the storage hopper.

7. The elevator assembly of claim 1, wherein a speed of the conveyor is variable by adjusting the second drive roller with the controller.

8. The elevator assembly of claim 1, wherein the distal end of the elevator is fixed relative to the elevator housing.

9. The elevator assembly of claim 1, wherein the elevator is positioned above the first end of the conveyor.

\* \* \* \* \*